(12) United States Patent
Chung et al.

(10) Patent No.: US 6,532,106 B2
(45) Date of Patent: Mar. 11, 2003

(54) ALL-OPTICAL GAIN CONTROLLED BIDIRECTIONAL ADD/DROP OPTICAL AMPLIFIER

(75) Inventors: Yun Chur Chung, Taejon (KR); Chul Han Kim, Kyung Ki-Do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/753,451

(22) Filed: Jan. 4, 2001

(65) Prior Publication Data

US 2001/0050804 A1 Dec. 13, 2001

(30) Foreign Application Priority Data

Jun. 12, 2000 (KR) ........................................ 2000-32105

(51) Int. Cl.[7] .............................................. H04B 10/12
(52) U.S. Cl. .................................. 359/341.2; 359/337.1
(58) Field of Search ............................ 359/337, 337.11, 359/337.21, 341.4, 118, 337.1, 341.2; 372/6, 31, 94, 102

(56) References Cited

U.S. PATENT DOCUMENTS

| | | | | |
|---|---|---|---|---|
| 5,452,124 A | * | 9/1995 | Baker | 359/341 |
| 5,504,609 A | * | 4/1996 | Alexander | 359/125 |
| 5,530,583 A | * | 6/1996 | Uno | 359/341 |
| 5,555,118 A | * | 9/1996 | Huber | 359/125 |
| 5,557,442 A | * | 9/1996 | Huber | 359/179 |
| 5,579,143 A | * | 11/1996 | Huber | 359/130 |
| 5,608,571 A | * | 3/1997 | Epworth | 359/341 |
| 5,633,741 A | * | 5/1997 | Giles | 359/124 |
| 5,740,289 A | * | 4/1998 | Glance | 385/24 |
| 5,801,879 A | * | 9/1998 | Burton | 359/341 |
| 5,815,308 A | * | 9/1998 | Kim | 359/341 |
| 5,872,649 A | * | 2/1999 | Byron | 359/341 |
| 5,926,590 A | * | 7/1999 | Mao | 385/24 |
| 5,991,068 A | * | 11/1999 | Massicott | 359/337 |
| 5,995,259 A | * | 11/1999 | Meli | 359/134 |
| 6,025,941 A | * | 2/2000 | Srivastava | 359/119 |
| 6,081,368 A | * | 6/2000 | Delevaux | 359/341 |
| 6,137,932 A | * | 10/2000 | Kim | 385/37 |
| 6,160,660 A | * | 12/2000 | Aina | 359/341 |
| 6,172,802 B1 | * | 1/2001 | d'Auria | 359/341 |
| 6,175,444 B1 | * | 1/2001 | Toyohara | 359/341 |
| 6,188,509 B1 | * | 2/2001 | Lee | 359/341 |
| 6,222,962 B1 | * | 4/2001 | Nilsson | 385/37 |
| 6,282,340 B1 | * | 8/2001 | Nasu | 385/37 |
| 6,285,477 B1 | * | 9/2001 | Miyazaki | 359/124 |
| 6,288,810 B1 | * | 9/2001 | Grasso | 359/127 |
| 6,301,272 B1 | * | 10/2001 | Koch | 372/6 |
| 6,307,667 B1 | * | 10/2001 | Liang | 359/337 |
| 6,356,385 B1 | * | 3/2002 | Digonnet et al. | 359/337 |

FOREIGN PATENT DOCUMENTS

WO   WO 00/44072   *   7/2000   ........... H01S/3/067

OTHER PUBLICATIONS

Kim, C.H. et al. "All–Optical Gain–Controlled Bidirectional Add–Drop Amplifier Using Fiber Bragg Gratings." IEEE Photonics Tech. Lett., vol. 12, No. 7. Jul. 2000, pp. 894–896.*

(List continued on next page.)

Primary Examiner—Thomas H. Tarcza
Assistant Examiner—Andrew R. Sommer
(74) Attorney, Agent, or Firm—Bacon & Thomas

(57) ABSTRACT

A bidirectional add/drop optical amplifier used in wavelength division multiplexing (WDM) optical networks to suppress the power change resulting from the adding and dropping of optical signals using an all optical gain control includes two fiber Bragg gratings (FBGs) and a bidirectional add/drop optical amplifier module composed of an Arrayed Waveguide Grating (AWG) and two bidirectional optical amplifiers. The filtered amplified spontaneous emission (ASE) lights are lased with the two FBGs and then used to adjust the gain of the bidirectional amplifiers.

3 Claims, 3 Drawing Sheets

OTHER PUBLICATIONS

Kim, C.H. et al. "A Novel Bidirectional Add/Drop Amplifier (BADA)." IEEE Photonics Tech. Lett. vol. 10, No. 8, Aug. 1998. pp. 1118–1120.*

Park, J–W and Lee, C–H. "Wavelength Interleaved Bidirectional Add/Drop Amplifier Module." IEEE Photonics Tech. Lett. vol. 12, No. 2, Feb. 2000, pp. 326–328.*

Ko, S.Y. et al., "Gain Control in Erbium–Doped Fibre Amplifiers by Tuning Centre Wavelength of a Fibre Bragg Grating Constituting Resonant Cavity." Elect. Lett. vol. 34, No. 10, May 14, 1998. pp. 990–991.*

Kim, C.H. et al. "Bidirectional WDM Self–Healing Ring Network Based on Simple Bidirectional Add/Drop Amplifier Modules." IEEE Photonics Tech. Lett. vol. 10, No. 9, Sep. 1998. pp. 1340–1342.*

Zirngibl, M. "Gain Contrl in Erbium–Doped Fibre Amplifiers by an All–Optical Feedback Loop." Elect. Lett. vol. 27, No. 7, Mar. 1991. pp. 560–561.*

Kim, C.H. et al. "Bidirectional WDM Self–Healing Ring Network Based on Simple Bidirectional Add/Drop Amplifier Modules." OFCC 1999. OFC/IOOC '99 Technical Digest, Feb. 1999. pp. 180–181.*

Kim, C.H. and Chung, Y.C. "2.5 Gb/s x 16–Channel Bidirectional WDM Transmission System Using Bidirectional Erbium–doped Fiber Amplifier Based on Spectrally Interleaved Synchronized Etalon Filters." IEEE Photonics Tech. Lett. vol. 11, No. 6 Jun. 1999. 745–.*

Zyskind, J.L. et al. "Fast Link Control Protection for Surviving Channels in Multiwavelength Optical Networks." ECOC '96 $22^{nd}$ European Conference on. Sep. 1996. pp. 49–52.*

Chawki, M.J. et al. "WDM Bidirectional Optical Power Limiting Amplifier Inclulding Circulators, EDFA and Fiber Grating Reflectors." $22^{nd}$ European Conference on Optical Communication, 1996. pp. 285–288.*

Karasek, M and Valles, J.A. "Analysis of Channel Addition/Removal Response in All–Optical Gain–Controlled Cascade of Erbium–Doped Fiber Amplifiers." J. Lightwave Tech. vol. 16, No. 10, Oct. 1998. pp. 1795–1803.*

Yu, A. and O'Mahony, M.J. "Properties of Gain Controlled Erbium Doped Fibre Amplifiers by Lasing." Elec. Lett. vol. 31, No. 1 Aug. 3, 1995. pp. 1348–1349.*

Massicott, J.F. et al. "1480 nm pumped erbium doped fibre amplifier with all opticla automatic gain control." Elect Lett. vol. 30 No. 12, Jun. 9, 1994, pp. 962–964.*

Luo, G. et al. "Experimental and Theoretical Analysis of Relaxation–Oscillations and Specral Hole Burning Effects in All–Optica Gain–Clamped EDFA's for WDM networks." J. Lightwave Tech. vol. 16, No. 4, Apr. 1998. pp. 527–533.*

* cited by examiner (a)

(b)

ALL-OPTICAL GAIN CONTROLLED BIDIRECTIONAL ADD/DROP OPTICAL AMPLIFIER

BACKGROUND OF THE INVENTION

1. Field of the Invention

The present invention relates generally to a bidirectional add/drop optical amplifier used in the network node of wavelength division multiplexing (WDM) optical communications. More particularly, it relates to a bidirectional add/drop optical amplifier with an all-optical gain controlling function, which fixes the gain of the optical amplifier by lasing amplified spontaneous emission (ASE) lights through an optical feedback loop.

2. Description of the Related Art

Generally in the network node of WDM optical communications, the add/drop of optical signals are frequently performed to solve network problems or to meet the user's requests. Due to the cross gain modulation property of the optical amplifier, this add/drop of optical signals changes the power of the surviving channels, which was not added/dropped. In order to suppress the unexpected power change for the surviving channels, several automatic gain control methods such as an all-optical gain control system, a pump control system, and a link control system have been proposed. Among these, the all-optical gain control method fixes the gain of an optical amplifier by lasing the ASE light through an optical feedback loop. And this method gives the advantage of controlling a gain relatively easy by utilizing a pair of fiber Bragg gratings (FBGs) or by using two optical couplers and one optical band pass filter (OBPF).

Furthermore, recently some studies on a self-healing network of WDM optical communication, using a bidirectional add/drop optical amplifier with a pair of optical fibers, are undertaking. The Korean Patent Application 1998-63, applied by the present applicants on Jan. 5, 1998, relates to a bidirectional add/drop optical amplifier realized by a pair of optical fibers, used in a self-healing network of a WDM optical communication. This self-healing network of a bidirectional WDM optical communication has the advantage of reducing the numbers of optical fibers and other elements by half compared with the conventional network of the bidirectional optical communication with two pairs of optical fibers.

In order to apply a bidirectional add/drop amplifier to the actual network node of a WDM optical communication, the bidirectional add/drop amplifier should be equipped with an all-optical gain controlling function.

SUMMARY OF THE INVENTION

Therefore, the present invention is contrived in order to solve the above-mentioned problem of existing technology. It is an object of the present invention to provide a bidirectional add/drop optical amplifier equipped with an all-optical gain controlling function by applying a pair of FBGs to the bidirectional add/drop optical amplifier realized by two pieces of optical fibers.

The bidirectional add/drop optical amplifier with an all-optical gain controlling function according to the present invention among the bidirectional add/drop optical amplifiers, which add/drop and amplify bidirectionally propagating WDM optical signals through optical fibers for signal transmission, comprises five parts. (1) One arrayed waveguide grating (AWG) multiplexing/de-multiplexing the bidirectionally propagating optical signals simultaneously and adding/dropping the WDM optical signals. (2) Two bidirectional amplifiers, located at the both sides of the AWG, amplifying the bidirectionally propagating optical signals, and emitting ASE lights with the amplified optical signals. (3) Two OBPFs, connected at the both sides of the AWG, filtering the Rayleigh back scattered signals of the WDM optical signals outputted from the AWG after the add/drop process. (4) Two 3-port circulators, connected to the AWG, the EDFA, and the OBPF, transmitting the amplified signals of the bidirectional amplifier to the AWG, and passing the filtered signals of the OBPF to the bidirectional amplifier. (5) Two power control means, connected between the bidirectional amplifier and the signal transmitting optical fiber at the both sides of the AWG, forming an lasing cavity with the AWG and the OBPF using the ASE lights from the bidirectional amplifier, and constraining the bidirectional amplifier's output power change due to the adding/dropping the bidirectional signals.

In a preferred embodiment, two power control means comprise two FBGs whose center wavelengths, separated by one FSR of the AWG, are equal to those of the filtered ASE lights at the multiplexing channel of the AWG.

BRIEF DESCRIPTION OF THE DRAWINGS

Exemplary embodiments of the present invention will be described in conjunction with the drawings in which.

EXPLANATIONS FOR MAIN SYMBOLS IN THE DRAWINGS

AWG: Arrayed Waveguide Grating
OBPF: Optical Band Pass Filter
EDFA: Erbium Doped Fiber Amplifier
FBG: Fiber Bragg Grating
11, 11': Circulator
12, 12': Coupler
13, 13': Optical Variable Attenuator

DETAILED DESCRIPTION OF THE EMBODIMENTS

Below, we will explain in detail "all-optical gain controlled bidirectional add/drop optical amplifier" according to an embodiment of the present invention, with the drawings.

Before explaining the present invention, we will explain briefly the 'bidirectional add/drop optical amplifier' of the above mentioned Korean Patent Application 1998-63. The bidirectional add/drop optical amplifier comprises one arrayed waveguide grating (AWG) and two optical amplifiers, and it can amplify or add/drop bidirectional WDM signals. The ASE light is filtered at every ports of the AWG due to the structural characteristic.

In the present invention, two fiber Bragg gratings are attached at both sides of the previous bidirectional add/drop optical amplifier, and the gain of the present bidirectional amplifier are fixed by lasing the filtered ASE light. When the previous bidirectional add/drop optical amplifier is equipped with the all-optical gain controlling function in this way, the self-healing network node of a WDM optical communication is realized more economically.

Now, the all-optical gain controlled bidirectional add/drop optical amplifier according to the present invention is explained.

Figure 1:
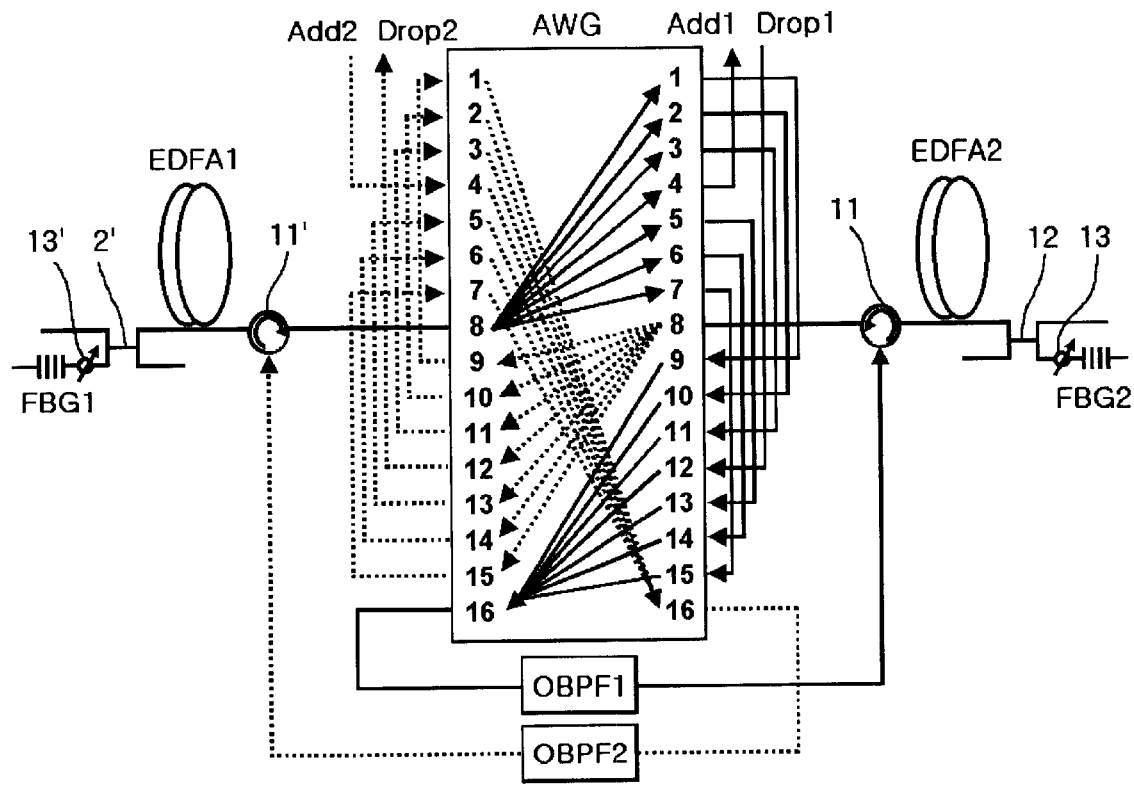
FIG. 1 is a schematic diagram for the all-optical gain controlled bidirectional add/drop optical amplifier according to an embodiment of the present invention.

FIG. 1 is a schematic diagram for the all-optical gain controlled bidirectional add/drop optical amplifier according to an embodiment of the present invention. The bidirectional add/drop optical amplifier is realized with one 16×16 AWG. The channel interval of this 16×16 AWG is 100 GHz, and its insertion loss is 6 dB.

First of all, the principle of the embodied bidirectional add/drop optical amplifier is explained as follow: The seven WDM optical signals transmitted from each direction is inputted to the 8th port of the AWG, and de-multiplexed according to their wavelengths. Explaining down-stream signals propagating from the left to the right optical fiber, the WDM optical signals inputted to the 8th left port are de-multiplexed into the 1st–7th right ports. At this time, the signal de-multiplexed into the 4th right port is dropped (Drop1) into the present node, and the signals de-multiplexed into other right ports are inputted to the 9th–11th and 13th–15th right ports in order to transmit the present node. In the meantime, the added signal (Add1) at this node is inputted to the 12th right port. The signals passed or added in these ways are multiplexed again at the 16th left port, and these re-multiplexed signals pass through OBPF1.

Now, explaining up-stream signals propagating from the right to the left optical fiber, the WDM optical signals inputted to the 8th right port are de-multiplexed into the 9th–15th left ports. At this time, the signal de-multiplexed into the 12th left port is dropped (Drop2) into this node, and the signals de-multiplexed into other ports are inputted to the 1st–3rd, 5th–7th left ports to transmit the present node. In the meantime, the added signal (Add2) at this node is inputted to the 4th left port. The signals passed or added in these ways are multiplexed again at the 16th right port, and the re-multiplexed signals pass through OBPF 2.

OBPF1 and OBPF2 restrain a relative intensity noise (RIN) caused by unwanted reverse-direction signals in the bidirectional optical communication system. The OBPF1 and OBPF2 with the insertion loss of 2 dB used in the experiment of the bidirectional add/drop optical amplifier according to the present invention have center wavelengths of 1548.15 nm and 1558.17 nm, respectively. And there are enough band (3-dB band width>6 nm) to pass the seven WDM signals in each direction.

The WDM optical signals passing OBPF1 or OBPF2 pass the corresponding circulator (11 or 11') and propagate to the Erbium Doped Fiber Amplifier (EDFA2 or EDFA1). The circulator (11 or 11') with insertion loss of about 1.5 dB is used in order to input the signals passed OBPF1 or OBPF2 into an optical fiber of an optical transmission waveguide. In addition, EDFA1 or EDFA2 is made of 12 m-long erbium doped fiber and excited by a pump laser with an output of 40 mW at 980 nm. The present bidirectional add/drop optical amplifier has a signal gain of 20 dB at an input signal of −20 dBm per channel, and a noise figure of about 5 dB.

In order to add an all-optical gain controlling function to the just mentioned bidirectional add/drop optical amplifier, two 3-dB couplers (2,12'), two FBGs, and two optical variable attenuators (13,13') are attached to the both sides of the amplifier.

Below, the all-optical gain controlling function realized in this bidirectional add/drop optical amplifier is explained as follows: The ASE light generated at EDFA1 or EDFA2 exists over broad band (~30 nm), and is inputted with WDM signals to the 8th port in each direction of AWG through the circulator (11 or 11'). These ASE lights are filtered according to the passing wavelength corresponding to each port of the AWG, and appear at the opposite port of the input port. The ASE lights filtered in this way have several peaks separated by the free spectral range (FSR) of the AWG, and appear periodically. In the experiment of the present invention, an AWG with 12.8 nm FSR are used.

Especially, the peaks of the ASE lights are multiplexed with a WDM signal in the 16th port in each direction, and are inputted to OBPF1 or OBPF2. Since OBPF1 or OBPF2 has a limited passing band (~10 nm), the only one of several ASE peaks passes through OBPF1 or OBPF2 with seven optical signals. This filtered peak is amplified by EDFA2 or EDFA1, reflected by FBG2 or FBG1, and re-inputted to EDFA2 or EDFA1. An optical feedback loop, which can fix the gain of each amplifier, is formed by the oscillations of the peak between both EDFAs in this way.

For example, at the 16th right port of the AWG, the peaks of ASE lights generated at EDFA1, separated by a FSR, appear. And these ASE peaks are multiplexed with seven up-stream signals. However, only one ASE light peak with center wavelength of 1559.79 nm among the ASE peaks passes OBPF2, and is inputted to EDFA1 again. This ASE peak re-input in this way is amplified by EDFA1, reflected by FBG1, and an ASE lasing cavity is formed. This ASE lasing cavity controls the gain of the erbium doped optical fiber amplifier (EDFA1).

If we form a lasing cavity using the ASE in this way, the power of the lasing wavelength increases when the power of an input signal decreases, and the power of the lasing wavelength decreases when the power of an input signal increases. Thus, the power inputted to the amplifier remains always constant; the power inputted to the amplifier is automatically controlled and remains constant irrespective of the input signal power. Therefore, we can realize a gain controlled optical amplifier.

The 3-dB bandwidth of the FBG used in the experiment is 0.2 nm, and the insertion loss is 0.5 dB. In addition, the center wavelengths of FBG1 and FGB2 are 1546.92 nm and 1559.79 nm, respectively. The amplifier according to the present invention has gain controlling function by forming a ring-type lasing cavity, using the ASE outputted from the 16th left and right ports. Although the center wavelength of the FBG1 or FGB2 has to be coincident with that of the filtered ASE peak, it is sufficient that OBPF1 or OBPF2 has a enough bandwidth to pass up-stream and down-stream signals. It is not necessary that the center wavelength of the band pass filter is equal to that of the FBGs.

The center wavelengths of the FBGs are coincident with that of the AWG 16th ports, and are separated by one FSR. The optical variable attenuators (13, 13') are used in order to determine the gain of the optical amplifier by controlling the loss of the ASE lasing cavity. The signal gain of the present bidirectional add/drop optical amplifier module is 13 dB at an input signal of −20 dBm per channel. The couplers (12, 12') and the optical attenuators (13, 13') comprise a ring-type lasing cavity.

Figure 2:
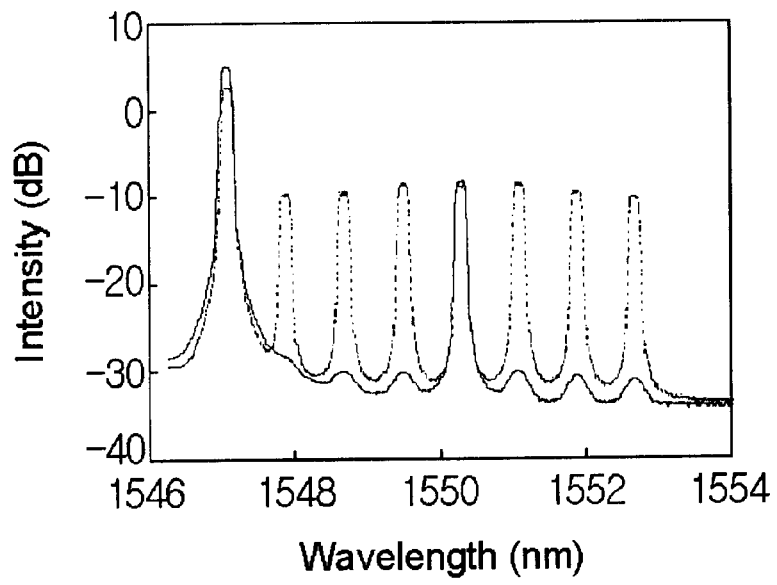
FIG. 2 shows the output spectrum (a) of a down-stream signal and (b) of an up-stream signal measured at both outputs of, the all-optical gain controlled bidirectional add/drop optical amplifier according to the embodiment of the present invention.
Figure 2:
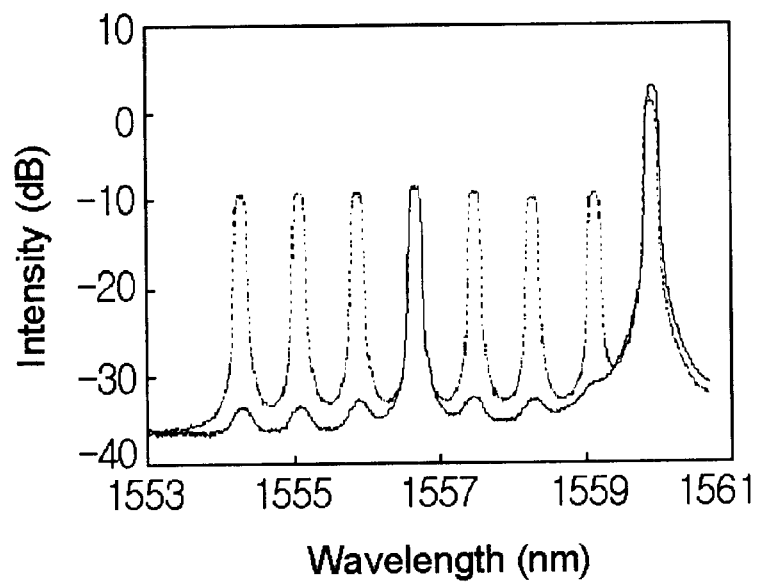

FIG. 2 shows the output spectrum (a) of a down-stream signal and (b) of an up-stream signal measured at both outputs of the all-optical gain controlled bidirectional add/drop optical amplifier according to the embodiment of the present invention. Seven WDM signals are inputted into each direction of the optical amplifier. The wavelength bands of the used down-stream and up-stream signals are 1547.72~1552.52 nm and 1554.13~1558.98 nm, respectively. The channel interval is 100 GHz. FIG. 2 shows the measured output spectra for inputting 14 channels (solid line) and one channel (dotted line) into the optical amplifier module.

From FIG. 2, the ASE peaks observed at 1546.92 nm (a) and 1559.79 nm (b) are lased for all-optical gain control as explained above. We can see that, with the proposed method, the signal gains of EDFA1 and EDFA2 can be kept constant efficiently. That is, when 13 signal out of 14 WDM signals are dropped, the power change of one surviving channel (down-stream: 1550.12 nm, up-stream: 1556.55 nm) is measured to be smaller than 0.2 dB.

Figure 3:
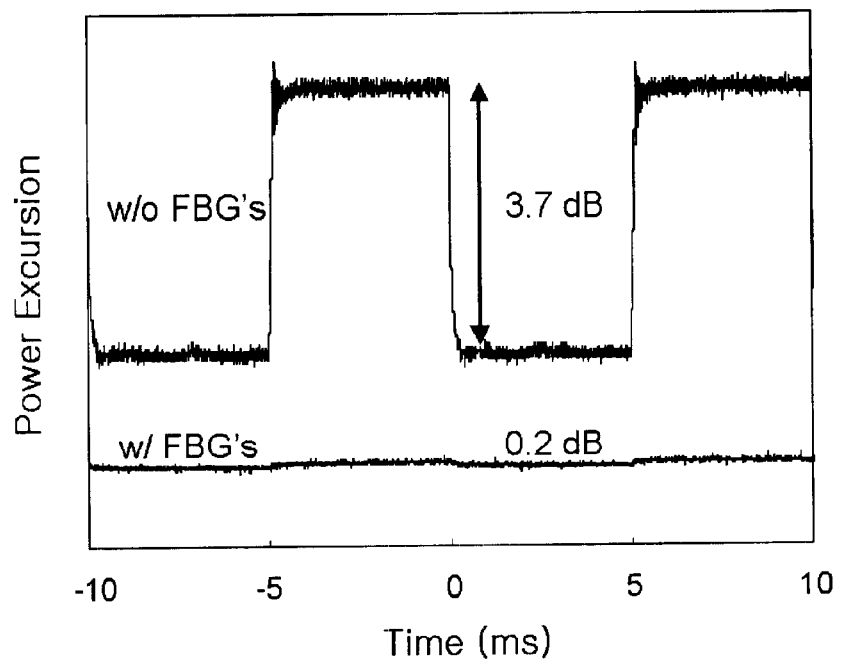
FIG. 3 shows the power excursion of the one surviving channel with and without the FBGs when thirteen signals among fourteen WDM signals are bidirectionally added/dropped in the all-optical gain controlled bidirectional add/drop optical amplifier according to an embodiment of the present invention.

FIG. 3 shows the power excursion of the one surviving channel (1550.12 nm) with and without the FBGs in the bidirectional add/drop optical amplifier. To simulate the bidirectional add/drop of WDM signals, 13 signals among 14 WDM signals are modulated with 100 Hz square waves by two acousto-optic modulators (AOMs). One of the two AOMs was used for 7 up-stream signals, and the other for 6 down-stream signals. The measured traces indicated below and above in FIG. 3 represent the power excursions of the surviving channel with and without the FBGs.

As shown in the experimental results, the power excursion of the surviving channel without FBGs reaches up to 3.7 dB when we add/drop the thirteen of 14 signals (input power per channel is −20 dBm). But the power excursion is reduced below 0.2 dB when two FBGs are used in the present optical amplifier. In addition, the power change by the relaxation oscillation was hardly observed in the present bidirection add/drop optical amplifier.

Figure 4:
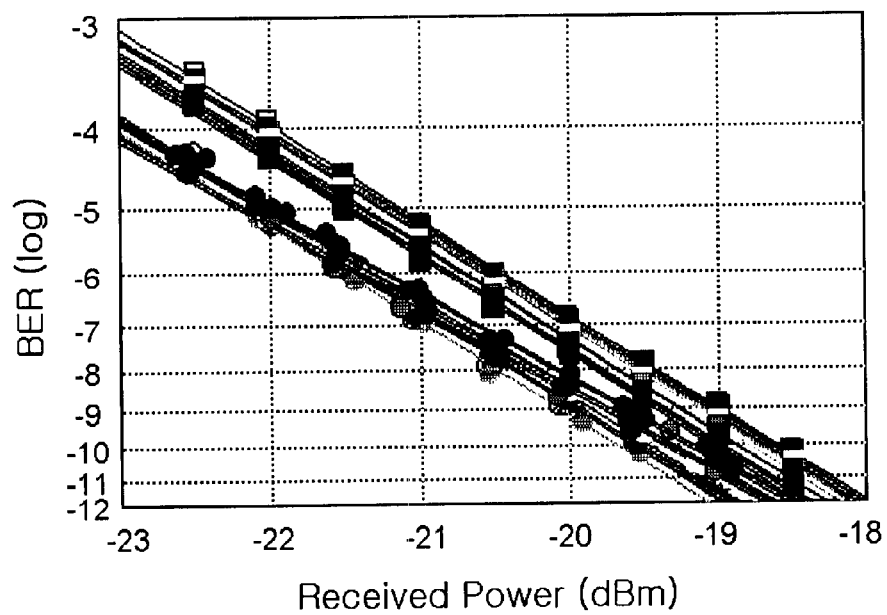
FIG. 4 shows the measured bit error rate (BER) when the WDM optical signals are transmitted with the all-optical gain controlled bidirectional add/drop optical amplifier according to the embodiment of the present invention.

In order to confirm the performance of the present bidirectional add/drop optical amplifier, the bit error rate (BER) of 14 WDM channels are measured as shown in FIG. 4. Seven optical signals in each direction are wavelength-division nultiplexed with couplers, and modulated simultaneously with 10 Gb/s (pattern length: $2^{31}-1$) by a LiNbO$_3$ modulator. These modulated signals are transmitted through the single mode optical fiber with the length of 20 km, and are amplified by the bidirectional add/drop optical amplifier according to the present invention. The 20-km long optical fiber has an enough length to observe the Rayleigh back scattering effect which can cause a falling-off in performance of the bidirectional optical transmission system. The amplified signals by the present optical amplifier are transmitted through a 20-km long single-mode optical fiber again, and are de-multiplexed with a circulator and a de-multiplexer. These de-multiplexed signals are received with a PIN receiver.

In order to confirm the effect of the gain controlling function on the transmission performances, we simulate a bidirectional add/drop by modulating the signals. of the other thirteen channels into 100 Hz with two AOMs when the BER of each channel is measured. FIG. 4 shows the BER of 7 down-stream and 7 up-stream signals. When the signals are transmitted through a 40-km long single-mode optical fiber, the receiver sensitivity of the 14 channels is measured to be −19.8±0.3 dBm at the BER of $10^{-9}$. In addition, we observe that the receiver sensitivity transmitted through an optical fiber is improved a little compared to the back-to-back case where the optical fiber is not used, and it is due to the chirp parameter of LiNbO$_3$ modulator. From the above results, we can confirm that the all-optical gain controlled bidirectional add/drop optical amplifier according to the present invention does not produce any penalty.

In general, the signal gain of the all-optical gain controlled optical amplifier is determined by the loss of the lasing cavity. The main factors of the loss are the insertion loss of each kind of optical element in the cavity and the reflectivity of the FBGs. In the present invention, 3-dB couplers and optical variable attenuators are used in addition to the FBGs, in order to adjust the signal gain of the bidirectional add/drop optical amplifier. But the noise figure of the optical amplifier is increased to ~8.4 dB when these elements (3-dB couplers and optical variable attenuators) are used. However, in the bidirectional add/drop optical amplifier according to the present invention, if we use FBGs, where their reflectivity can be controlled precisely, it can be realized without the above elements (couplers and optical variable attenuators). That is, we can realize the all-optical gain controlled bidirectional add/drop optical amplifier by using only two FBGs at both sides of the bidirectional add/drop optical amplifier, and the all-optical amplifier improve the performances such as signal gain, noise figure, saturated output power, and etc.

Although we above explained the present invention based on an embodiment, this embodiment is displayed in order to illustrate, not to limit the present invention. It is evident to an expert in the field of the present invention that various change, modification and adjustment of the embodiment are possible without deviating from the technical idea of the present invention. Therefore, the protection scope of the present invention should be not restricted to the following claims, and has to be interpreted to contain all the above examples of changes, modifications, and adjustment.

According to the present invention, there is an advantage of simply realizing the all-optical gain controlled bidirectional add/drop optical amplifier, which is achieved by fixing the gain of the bidirectional amplifier with the lasing of the ASE lights. And this ASE lights is lased by the pair of FBGs at the realized bidirectional add/drop optical amplifier.

This all-optical gain controlled bidirectional add/drop optical amplifier has very small power change for the surviving channel, which was not added/dropped. And there is no penalty in the receiver sensitivity even though wavelength-division multiplexed signal is transmitted bidirectionally.

What is claimed is:

1. An all-optical gain controlled bidirectional add/drop optical amplifier, which adds or drops and amplifies bidirectionally propagating WDM optical signals through optical fibers for signal transmission, comprising:

one arrayed waveguide grating (AWG) arranged to multiplex and de-multiplex the bidirectionally propagating WDM optical signals simultaneously and to add or drop the bidirectionally propagating WDM optical signals;

two bidirectional amplifiers, located at both sides of the AWG and arranged to amplify the bidirectionally propagating WDM optical signals, and to emit amplified spontaneous emission (ASE) lights with the amplified bidirectionally propagating WDM optical signals;

two optical bandpass filters (OBPFs) connected at both sides of the AWG and arranged to filter Rayleigh back scattered signals of the bidirectionally propagating WDM optical signals outputted from the AWG after the WDM optical signals have been added or dropped;

two 3-port circulators connected to the AWG, the bidirectional amplifier, and the OBPF, the and arranged to transmit the amplified bidirectionally propagating WDM optical signals from the bidirectional amplifiers to the AWG and to pass filtered Rayleigh back scattered signals from the OBPF to respective said bidirectional amplifiers; and two power control means connected between respective said bidirectional amplifiers and the signal transmitting optical fiber at both sides of the AWG for forming a lasing cavity with the AWG and the OBPF using the ASE lights from the bidirectional amplifiers, and constraining the respective bidirectional amplifier's output power change due to the adding/dropping of the bidirectional signals, whereby said AWG forms a reflection route having a wide bandpass characteristic, and wherein each of the bidirectional amplifiers is gain controlled by an adjacent one of said two power control means.

2. An all-optical gain controlled bidirectional add/drop optical amplifier as defined in claim 1, wherein said two power control means comprise two fiber Bragg gratings whose center wavelengths, separated by a free-spectral range (FSR) of the AWG, are equal to those of the filtered ASE lights at the multiplexing channel of the AWG.

3. An all-optical gain controlled bidirectional add/drop optical amplifier as defined in claim 2, wherein each power control means further comprises an optical variable attenuator controlling the gain of the bidirectional amplifier by controlling the power loss of the lasing cavity and a coupler forming a ring-type lasing cavity with the optical variable attenuator.

* * * * *